(12) United States Patent
Kazerani et al.

(10) Patent No.: US 12,474,868 B2
(45) Date of Patent: Nov. 18, 2025

(54) RELIABLE LOCKDOWN COMMUNICATION IN WIRELESS ELECTRONIC LOCKS

(71) Applicant: MOTOROLA SOLUTIONS, INC., Chicago, IL (US)

(72) Inventors: Alexander Kazerani, Pacific Palisades, CA (US); Amir Khakpour, Los Angeles, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 113 days.

(21) Appl. No.: 18/390,372

(22) Filed: Dec. 20, 2023

(65) Prior Publication Data

US 2025/0208791 A1 Jun. 26, 2025

(51) Int. Cl.
*G06F 3/06* (2006.01)

(52) U.S. Cl.
CPC ............ *G06F 3/0659* (2013.01); *G06F 3/067* (2013.01); *G06F 3/0604* (2013.01)

(58) Field of Classification Search
None
See application file for complete search history.

(56) References Cited

U.S. PATENT DOCUMENTS

| | | | |
|---|---|---|---|
| 10,769,877 | B2 | 9/2020 | Kaye et al. |
| 11,469,789 | B2 * | 10/2022 | Sharma .................... H04B 1/16 |
| 11,482,088 | B1 | 10/2022 | Russo et al. |
| 11,657,662 | B2 | 5/2023 | Setter et al. |
| 2018/0316381 | A1 | 11/2018 | Sharma et al. |
| 2019/0082324 | A1 | 3/2019 | Hu |
| 2019/0193746 | A1 | 6/2019 | Golov |
| 2019/0236869 | A1 | 8/2019 | Kazerani et al. |
| 2023/0016625 | A1 | 1/2023 | Sharma et al. |
| 2023/0123495 | A1 | 4/2023 | Kuenzi et al. |

FOREIGN PATENT DOCUMENTS

| | | | | |
|---|---|---|---|---|
| CN | 107135229 | A * | 9/2017 | ............ H04L 9/0872 |
| JP | 5423653 | B2 | 2/2014 | |
| WO | 2019014516 | A1 | 1/2019 | |

OTHER PUBLICATIONS

International Search Report and Written Opinion for Application No. PCT/US2024/057505 dated Mar. 4, 2025 (27 pages).

\* cited by examiner

*Primary Examiner* — K. Wong
(74) *Attorney, Agent, or Firm* — Michael Best & Friedrich LLP

(57) ABSTRACT

An example apparatus includes a locking mechanism, a transceiver, a memory storing a default plan for the locking mechanism, and an electronic processor. The electronic processor is configured to retrieve, from the memory, and execute cause the electronic processor to: control the locking mechanism based on the default plan and a current time; receive, via the transceiver, a first lockdown command sent according to a first protocol; receive a second lockdown command sent according to a second protocol; determine a selected lockdown command by selecting one of the first lockdown command and the second lockdown command based on a first time of receipt for the first lockdown command and a second time of receipt for the second lockdown command; discard the other of the first lockdown command and the second lockdown command; and override the default plan by controlling the locking mechanism based on the selected lockdown command.

20 Claims, 3 Drawing Sheets

RELIABLE LOCKDOWN COMMUNICATION IN WIRELESS ELECTRONIC LOCKS

BACKGROUND

Locations, which include buildings and appurtenant outdoor areas, have varying needs for restricting access. Access to some areas of a location may be restricted, while access to other areas may be less restricted. In some instances, access is controlled by securing doors, gates, and the like with wireless electronic locks. Such locks may be remotely controlled to lock and unlock (e.g., based on a schedule, an authenticated access request, and the like). During public safety or other types of incidents (e.g., active shooter situations, chemical spills, crimes in progress, and the like), it may be necessary to override default security settings and initiate a lockdown state. During a lockdown, wireless electronic locks are remotely controlled to engage or disengage according to a predetermined lockdown plan in order to secure people and property, to provide for emergency egress, assist personnel responding to the incident, and the like.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
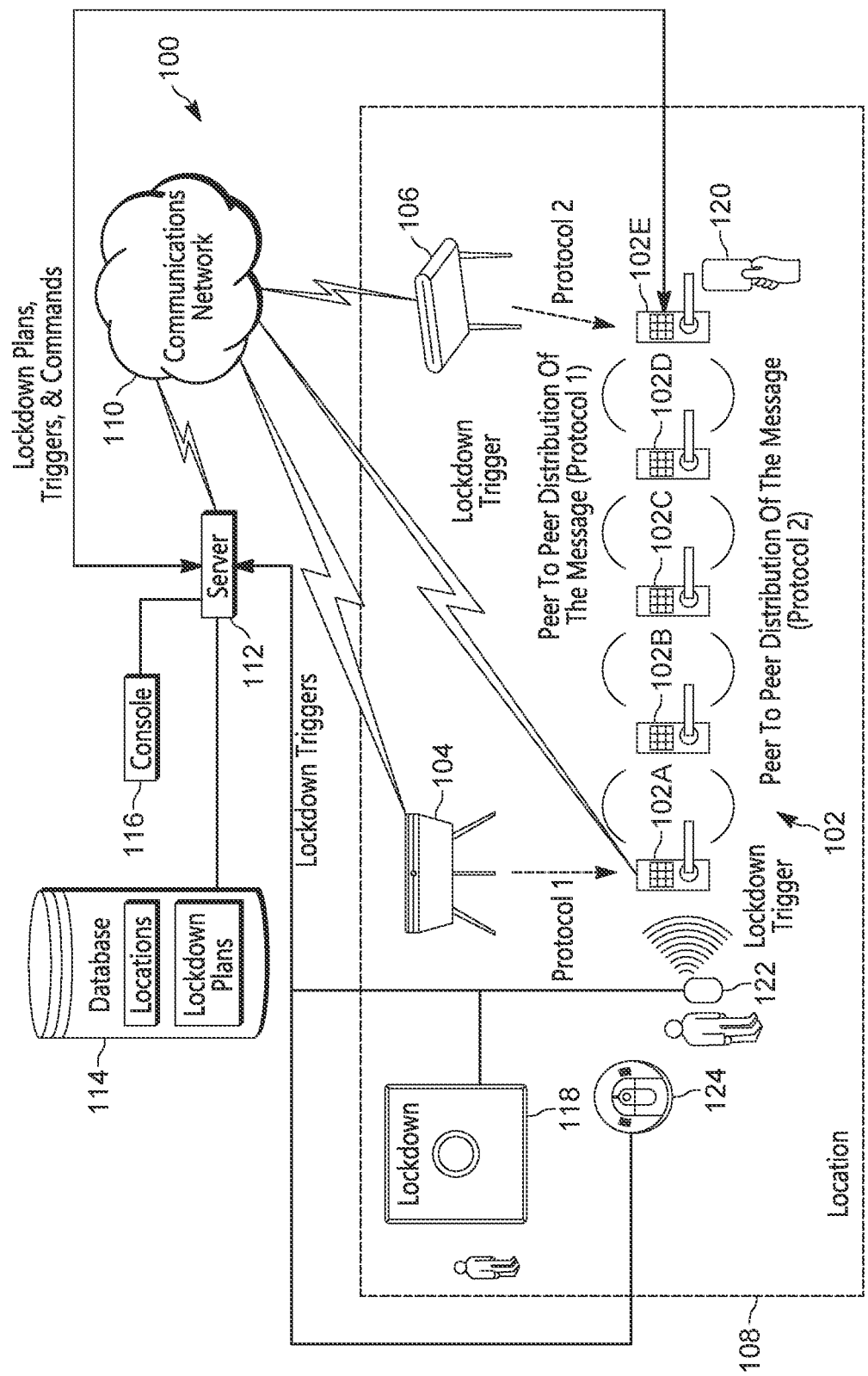
FIG. 1 illustrates a security system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Locations, which include buildings and enclosed outdoor areas, may be secured using electronic locks, which are capable of being remotely controlled. Such locations include government buildings, schools, corporate buildings or campuses, houses of worship, or other public locales. Areas of the locations are secured according to plans, which take into account factors, such as the date and time, the type of area, usage plans, and the like. For example, a school building may have its outer doors locked at all times, while classroom doors may be unlocked during school hours and locked after hours. Parking lot gates may be locked except during arrival and dismissal hours. An office building may have both interior and outer doors locked at all hours. An area open to the public may have many of its doors unlocked during the hours it is open and most or all doors locked while closed to public access. The locking and unlocking of doors and gates may be controlled remotely according to a plan. A plan may indicate, for example, what state each lock is to be in and when. During ordinary operations, a default plan may be executed.

However, there may be a need to override the default plan during certain situations. For example, when threats to safety occur in the area, it may be advisable to increase security in the area by initiating a "lockdown." As used herein, the term "lockdown" refers to an increased security status for the area. While the term lockdown may imply locking all doors, that is not always the case. Depending on the situation, it may be advisable to lock some doors and unlock others. For example, in the event of a fire, doors, which otherwise would be locked, are unlocked to afford egress from affected areas. In another example, in the event of a dangerous intruder, doors, which may otherwise be unlocked, are locked to allow people to shelter in place and prevent access to the intruder.

When a lockdown is initiated, as described herein, the current plan for controlling the electronic locks is overridden by a lockdown plan. A lockdown plan comprises lockdown commands, which instruct an electronic lock to operate according to the lockdown plan. Many electronic locks are configured to communicate over wireless networks, due to the cost and impracticability of deploying wired communications networks to each lock in a facility. It is important for security that wireless electronic locks receive their respective commands. Accordingly, some systems use redundant wireless connections to the wireless electronic locks. For example, some wireless electronic locks may connect to multiple wireless networks, may communicate with each other in a peer-to-peer or mesh network, or may use combinations of each. In such configurations, it is possible that a wireless electronic lock may receive multiple lockdown commands. In some instances, the same command may be received two or more times. In other instances, conflicting commands may be received. During a response to a security threat, multiple lockdown plans may be initiated and revoked as conditions change. This increases the risk that conflicting commands are received. In some instances, commands may be delayed, resulting in a wireless electronic lock receiving the command that is out of date. Thus, there exists a need for an improved technical method, device, and system for reliable lockdown communication with wireless electronic locks.

In accordance with one example embodiment, an apparatus includes: a locking mechanism; a transceiver; a memory storing a default plan for the locking mechanism; and an electronic processor coupled to the locking mechanism, the transceiver, and the memory. The electronic processor is configured to retrieve, from the memory, executable instructions that, when executed by the electronic processor, cause the electronic processor to: control the locking mechanism based on the default plan and a current time; receive, via the transceiver, a first lockdown command sent according to a first protocol; receive a second lockdown command sent according to a second protocol; determine a selected lockdown command by selecting one of the first lockdown command and the second lockdown command based on a first time of receipt for the first lockdown command and a second time of receipt for the second lockdown command; discard the other of the first lockdown command and the second lockdown command; and override the default plan by controlling the locking mechanism based on the selected lockdown command.

In accordance with another example embodiment, a method includes: controlling, with an electronic processor, a locking mechanism based on a default plan and a current time; receiving, via a transceiver, a first lockdown command sent according to a first protocol; receiving a second lockdown command sent according to a second protocol; determining a selected lockdown command by selecting one of the first lockdown command and the second lockdown command based on a first time of receipt for the first lockdown command and a second time of receipt for the second lockdown command; discarding the other of the first lockdown command and the second lockdown command; and overriding the default plan by controlling the locking mechanism based on the selected lockdown command.

Each of the above-mentioned embodiments will be discussed in more detail below, starting with example system and device architectures of the system in which the embodiments may be practiced, followed by an illustration of processing blocks for achieving an improved technical method, device, and system for reliable lockdown communication in wireless electronic locks.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example security system 100 is provided. In the illustrated example, the system 100 includes a plurality of wireless electronic locks 102A-E, a first wireless networking device 104 and a second wireless networking device 106. The wireless electronic locks 102A-E are deployed at a location 108. For ease of description, any or all of wireless electronic locks 102A-E may be referred to (e.g., individually or collectively) as the wireless electronic lock 102 or the wireless electronic locks 102.

Each of the wireless electronic locks 102 (described more particularly with respect to FIG. 2) is deployed at a door, gate, or other lockable portal at the location. As illustrated in FIG. 1, the first wireless networking device 104, the second wireless networking device 106, one or more of the wireless electronic locks 102, a server 112, and other components may be coupled via a communications network 110. The communications network 110 is a communications network including wireless connections, wired connections, or combinations of both. The communications network 110 may be implemented using various local and wide area networks, for example, a Bluetooth™ network, a Wi-Fi network), the Internet, a land mobile radio network, a cellular data network, a Long Term Evolution (LTE) network, a 4G network, a 5G network, or combinations or derivatives thereof.

The server 112 and the database 114 operate to, among other things, issue commands to the wireless electronic locks 102 according to, among other things, lockdown plans. The server 112 is a computing device that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor of the server 112 is configured to retrieve instructions and data from the memory and execute, for example, functions as described herein. The server 112 is communicatively coupled to, and writes data to and from, the database 114. In the illustrated embodiment, the database 114 is a database housed on a suitable database server communicatively coupled to and accessible by the server 112. In some instances, the database 114 is part of a cloud-based database system (for example, a data warehouse) external to the system 100 and accessible by the server 112 over one or more wired or wireless networks. In other instances, all or part of the database 114 is locally stored on the server 112. In some instances, both the server 112 and the database 114 are part of a cloud-based system. In some examples, the system 100 may be configured and controlled via a computer console 116, which is communicatively coupled to the server 112.

In some examples, the server 112 and the database 114 are part of a computer-aided dispatch system or other central security control system. As illustrated in FIG. 1, in some instances the database 114 electronically stores location data and lockdown plans.

Examples of location data include maps for locations, including information on doors, gates, and other portals securable with wireless electronic locks.

A lockdown plan defines the desired state (e.g., locked or unlocked) for each wireless electronic lock 102 during a lockdown. A lockdown plan may include other information, for example, an ordinal that serves as a rank for the plan, a time limit for the plan, and the like. Multiple lockdown plans may exist for each location. In some aspects, lockdown plans are established based on the type of incident that may trigger the lockdown (e.g., an active shooter, a fire, a chemical spill, and the like). In some examples, the server 112 stores the lockdown plans and distributes them periodically to the wireless electronic locks 102.

As illustrated in FIG. 1, the wireless electronic locks 102 may be connected to the server 112, to each other, and to other devices of the system 100 by multiple means. For example, the first wireless networking device 104 and the second wireless networking device 106 may be wireless access points or wireless gateways. In some instances, each of the first wireless networking device 104 and the second wireless networking device 106 operate according to its own wireless protocol, different than the other. Example wireless protocols include Wi-Fi™, Bluetooth™, Zigbee™, Z-wave™, cellular, a proprietary wireless protocol, and/or a future developed wireless protocol. In some examples, as illustrated in FIG. 1, each of the wireless electronic locks 102, is capable of communicating wirelessly with one or more of the other wireless electronic locks 102 (e.g., using a peer-to-peer, mesh, or similar wireless networking protocol) to retransmit received lockdown commands to other wireless electronic locks 102. A lockdown condition may be triggered in multiple ways.

For example, the server 112 may receive a lockdown trigger from a button 118 pushed by a person at the location, or other manual input (e.g., a fire alarm being pulled). In this example, the server 112 may receive the lockdown trigger and transmit lockdown commands to the wireless locks 102 in accordance with a lockdown plan associated with the button 118.

In another example, a person at the location may use a lockdown card 120 (e.g., an access card, fob, key, or the like) to trigger a lockdown by "swiping" the wireless electronic lock 102E (or another of the wireless electronic locks 102). In some instances, the wireless lock 102E may transmit the lockdown trigger to the server 112, which receives the lockdown trigger and transmits lockdown commands to the wireless locks 102 in accordance with a lockdown plan associated with the lockdown card 120. In other instances, the wireless lock 102E may transmit the lockdown trigger to the server 112 and begin distributing lockdown commands through the network itself.

In another example, the server 112 may receive a command from a user. For example, a person using a portable computing device 122 (e.g., a smart watch, smart phone, tablet, or the like) or the console 116 may use an app to send a lockdown trigger to the server 112 (e.g., via the communications network 110). In another instance, the person using a portable computing device 122 may transmit a lockdown trigger (e.g., using Bluetooth™ or another suitable near-field communication protocol) to the wireless electronic lock 102A (or one or more of the other of the wireless electronic locks 102). In some instances, the wireless lock 102A may transmit the lockdown trigger to the server 112, which receives the lockdown trigger and transmits lockdown commands to the wireless locks 102 in accordance with a lockdown plan associated with the lockdown card 120. In other instances, the wireless lock 102A may transmit the lockdown trigger to the server 112 and begin distributing lockdown commands through the network itself.

In another example, the server 112 may receive a lockdown trigger in the form of an indication from an environmental monitor 124 (e.g., a smoke detector, a carbon monoxide or other chemical detector, a gunshot detector, and the like). In this example, the server 112 may receive the lockdown trigger and transmit lockdown commands to the wireless locks 102 in accordance with a lockdown plan associated with the indicator received from the environmental monitor 124.

Figure 2:
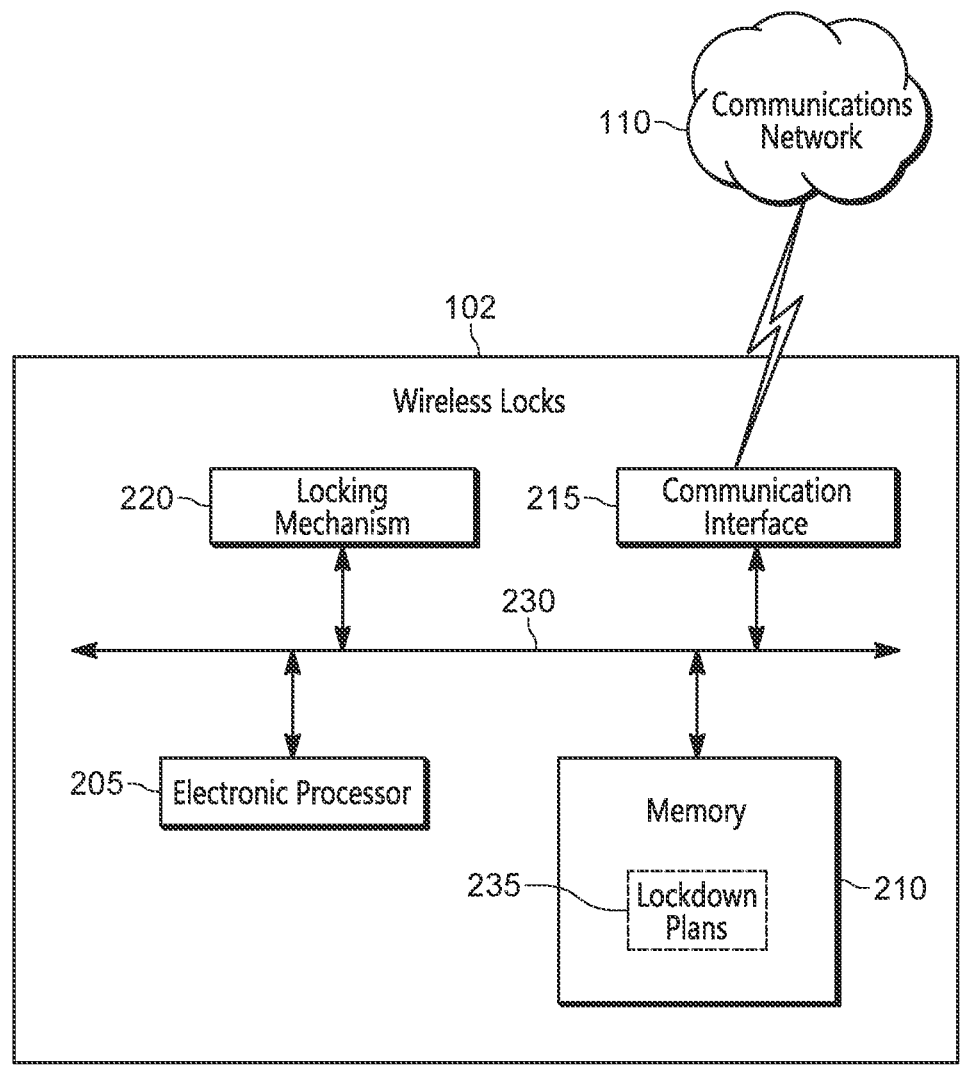
FIG. 2 illustrates a wireless electronic lock of the system of FIG. 1, according to some examples.

FIG. 2 illustrates an example wireless electronic lock 102. In the example provided, the wireless electronic lock 102 includes an electronic processor 205, a memory 210, a communication interface 215, and a locking mechanism 220. The illustrated components, along with other various modules and components (not shown) are coupled to each other by or through one or more control or data buses (for example, a bus 230) that enable communication therebetween.

The electronic processor 205 obtains and provides information (for example, from the memory 210 and/or the communication interface 215) and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software to carry out the methods described herein.

The memory 210 can include a program storage area and a data storage area. The program storage area and the data storage area can include combinations of different types of memory, as described herein. In the embodiment illustrated, the memory 210 stores, among other things, one or more lockdown plans 235.

The communication interface 215 is an electronic communication interface configured to receive input and to provide system output. The communication interface 215 obtains information and signals from, and provides information and signals to, (for example, over one or more wired and/or wireless connections) devices both internal and external to the server 112. The communication interface 215 may include one or more wireless transceivers for wirelessly communicating over the communications network 110 or other wireless networks, according to one or more protocols, as described herein. Alternatively, or additionally, the communication interface 215 may include a wired transceiver, such as an Ethernet transceiver, for communicating over the communications network 110 or a dedicated wired connection. It should be understood that, in some embodiments, the wireless electronic lock 102 communicates with other devices through one or more intermediary devices, such as routers, gateways, relays, and the like.

The locking mechanism 220 is an electromechanical locking mechanism including, for example, one or more motors, relays, gears, for securing a door, gate, or other portal, on which the wireless electronic lock 102 is installed. One example, locking mechanism 220 is an electronic deadbolt. Other configurations are possible. As described herein, the electronic processor 205 is configured to receive, via the communication interface 215, a lockdown command, and control the locking mechanism 220 based on the lockdown command (e.g., to engage or disengage the lock).

Figure 3:
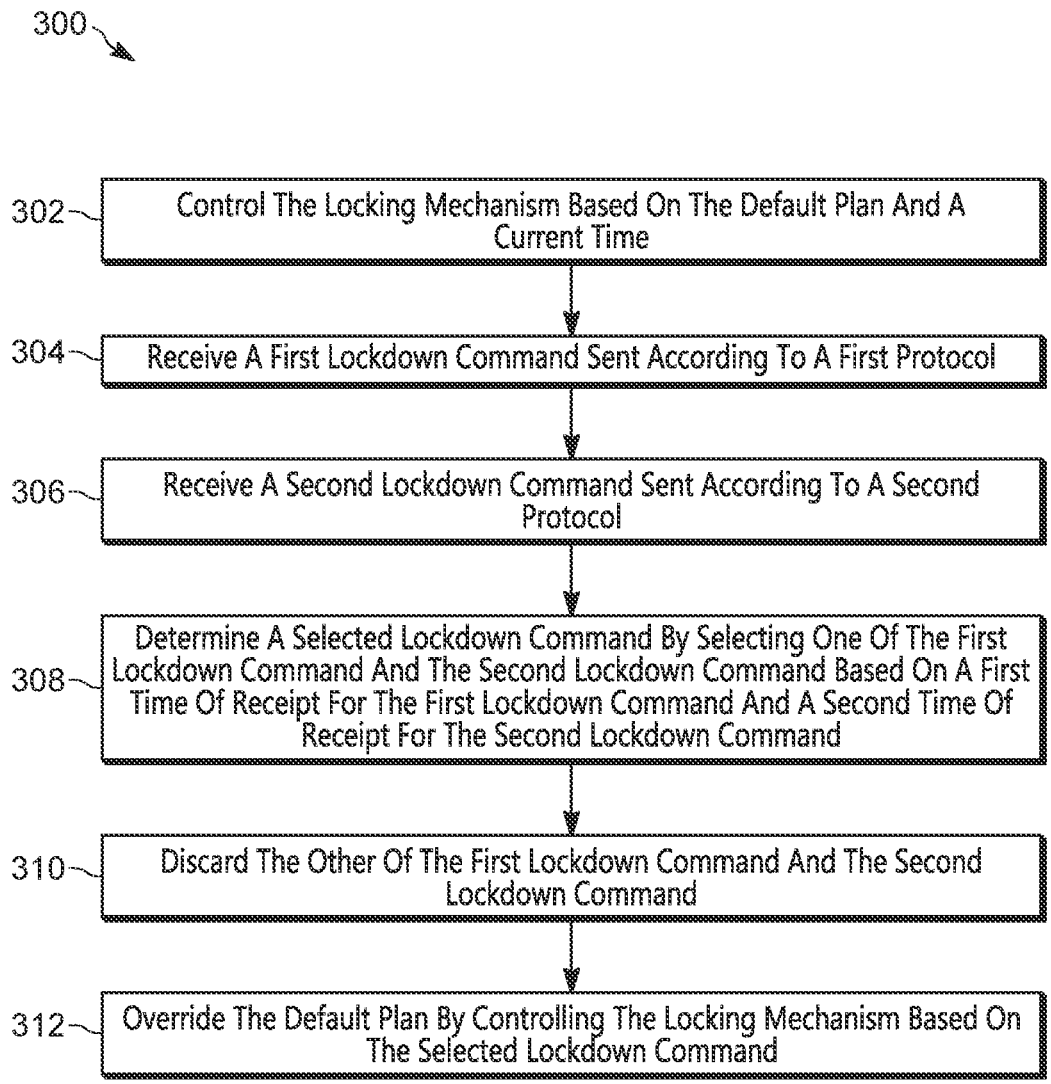
FIG. 3 is a flowchart illustrating a method for controlling the wireless electronic lock of FIG. 2, according to some examples.

FIG. 3 illustrates an example method 300 for, among other things, providing reliable lockdown communication with wireless electronic locks. Although the method 300 is described in conjunction with the system 100 as described herein, the method 300 may be used with other systems and devices. In addition, the method 300 may be modified or performed differently than the specific example provided.

By way of example, the method 300 is described as being performed by a wireless electronic lock 102 and, in particular, the electronic processor 205. However, it should be understood that portions of the method 300 are be performed by other devices, including for example, the server 112, and one or more of the wireless electronic locks 102A-E working in concert with one or more wireless network devices (e.g., the first wireless networking device 104, the second wireless networking device 106, and/or the server 112). For ease of description, the method 300 is described partially in terms of a single wireless electronic lock 102. However, the method 300 may be applied to systems including multiple wireless electronic locks operating together, as described herein.

The method 300 begins, at block 302, with the electronic processor 205 operating the wireless electronic lock 102 in a default mode (e.g., according to a default plan). In some aspects, the electronic processor 205 controls the locking mechanism based on a default plan and a current time. The default plan is stored in a memory (e.g., the memory 210) of the wireless electronic lock 102. A default plan is a plan, which specifies states and times for the wireless electronic lock, to be used when no other plans are in effect. For example, the default plan may specify that the locking mechanism is engaged (locked) between 6 PM and 7 AM and not engaged (unlocked) between 7 AM and 6 PM.

At block 304, the electronic processor 205 receives a first lockdown command sent according to a first protocol. For example, the first lockdown may be received according to a Wi-Fi™ protocol. A lockdown command is either a trigger command or a revert command and identifies a lockdown plan, which is stored in a memory (e.g., the memory 210) of the wireless electronic lock 102. A trigger command indicates that the electronic processor 205 should perform the action (lock or unlock) specified by the lockdown plan identified in the lockdown command. A revert command indicates that the electronic processor 205 should stop performing (or reverse) the action (lock or unlock) specified by the lockdown plan identified in the lockdown command. As described herein, the wireless electronic lock 102 may have more than one wireless transceiver, and may receive the first lockdown command from either one of the transceivers.

At block 306, the electronic processor 205 receives a second lockdown command sent according to a second protocol (e.g., different from the first protocol). For example, the first lockdown may be received according to a Bluetooth™ protocol.

In some instances, the wireless electronic lock 102 receives the first lockdown command from a first device (e.g., a computing device, a network gateway, a wireless access point, another wireless lock 102, the server 112, a portable communication device, or a portable computing device) and receives the second lockdown command from a second device.

At block 308, the electronic processor 205 determines how or whether to process the first and second lockdown commands. In some instances, the electronic processor determines a selected lockdown command by selecting one of the first lockdown command and the second lockdown command based on a first time of receipt for the first lockdown command and a second time of receipt for the second lockdown command. For example, in some instances, the first lockdown command and the second lockdown command are identical, and the electronic processor 205 may select the lockdown plan that was received first.

At block 310, the electronic processor 205 discards the other of the first lockdown command and the second lockdown command that was not selected. For example, if the second lockdown command was received before the first lockdown command, the electronic processor 205 discards the first lockdown command.

At block 312, the electronic processor 205 overrides the default plan by controlling the locking mechanism 220 based on the selected lockdown command. For example, the electronic processor 205 controls the locking mechanism 220 to engage or disengage, based on the lockdown plan. In some instances, the electronic processor 205 overrides the default plan by controlling the locking mechanism based on the selected lockdown command and an override time limit. For example, the lockdown plan associated with the lockdown command may have a time limit for a trigger command, after which the electronic processor 205 would revert to the default state.

In some instances, the wireless electronic lock 102 may receive a first lockdown command associated with a first lockdown plan and a second lockdown command associated with a second lockdown plan. Each lockdown plan has a rank (e.g., an ordinal). In such instances, the electronic processor 205 is configured to select one of the first lockdown command and the second lockdown command based on the ranks of the first lockdown plan and the second lockdown plan, regardless of the first time of receipt and the second time of receipt. For example, where the first lockdown plan ranks higher than the second lockdown plan, the first lockdown command is selected, and the second lockdown command is discarded.

In some instances, the wireless electronic lock 102 may receive two lockdown commands from the same lockdown plan, but the first lockdown command is of a first type (e.g., revert) the second lockdown command is of a second type (e.g., trigger). In such instances, the electronic processor 205 is configured to, instead of determining a selected lockdown command, control the locking mechanism by executing the first lockdown command and the second lockdown command based on the first time of receipt and the second time of receipt. For example, the electronic processor 205 will execute the commands in order of receipt.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The following paragraphs provide various examples of the embodiments disclosed herein.

Clause 1. An apparatus comprising: a locking mechanism; a transceiver; a memory storing a default plan for the locking mechanism; and an electronic processor coupled to the locking mechanism, the transceiver, and the memory; wherein the electronic processor is configured to retrieve, from the memory, executable instructions that, when executed by the electronic processor, cause the electronic processor to: control the locking mechanism based on the default plan and a current time; receive, via the transceiver, a first lockdown command sent according to a first protocol; receive a second lockdown command sent according to a second protocol; determine a selected lockdown command by selecting one of the first lockdown command and the second lockdown command based on a first time of receipt for the first lockdown command and a second time of receipt for the second lockdown command; discard the other of the first lockdown command and the second lockdown command; and override the default plan by controlling the locking mechanism based on the selected lockdown command.

Clause 2. The apparatus of clause 1, wherein the first lockdown command and the second lockdown command are identical.

Clause 3. The apparatus of clause 1, wherein: the memory stores a first lockdown plan; and the first lockdown command and the second lockdown command are associated with the first lockdown plan.

Clause 4. The apparatus of clause 1, wherein: the memory stores a first lockdown plan and a second lockdown plan, each having a rank; the first lockdown command is associated with the first lockdown plan; the second lockdown command is associated with the second lockdown plan; and the electronic processor is configured to: determine a selected lockdown command by selecting one of the first lockdown command and the second lockdown command based on the ranks of the first lockdown plan and the second lockdown plan, regardless of the first time of receipt and the second time of receipt.

Clause 5. The apparatus of clause 1, wherein: the first lockdown command is of a first type; the second lockdown command is of a second type; and the electronic processor is configured to, instead of determining a selected lockdown command: control the locking mechanism by executing the first lockdown command and the second lockdown command based on the first time of receipt and the second time of receipt.

Clause 6. The apparatus of clause 1, wherein each of the first lockdown command and the second lockdown command are either a trigger command or a revert command.

Clause 7. The apparatus of clause 1, wherein the electronic processor is configured to: receive the first lockdown command from a first device; and receive the second lockdown command from a second device.

Clause 8. The apparatus of clause 7, wherein each of the first device and the second device is one selected from a group consisting of a computing device, a network gateway, a wireless access point, a wireless lock, and a portable communication device.

Clause 9. The apparatus of clause 1, further comprising: a second transceiver, wherein the electronic processor is configured to: receive the second lockdown command from either one of the transceiver or the second transceiver.

Clause 10. The apparatus of clause 1, wherein each of the first protocol and the second protocol is one selected from a group consisting of a wireless LAN protocol, a cellular protocol, a near-field communication protocol, a peer-to-peer networking protocol, and a wired networking protocol.

Clause 11. The apparatus of clause 1, wherein the electronic processor is configured to retransmit, via the transceiver, at least one of the first lockdown command and the second lockdown command.

Clause 12. The apparatus of clause 1, wherein the electronic processor is configured to: override the default plan by controlling the locking mechanism based on the selected lockdown command and an override time limit.

Clause 13. A method comprising: controlling, with an electronic processor, a locking mechanism based on a default plan and a current time; receiving, via a transceiver, a first lockdown command sent according to a first protocol; receiving a second lockdown command sent according to a second protocol; determining a selected lockdown command by selecting one of the first lockdown command and the second lockdown command based on a first time of receipt for the first lockdown command and a second time of receipt for the second lockdown command; discarding the other of the first lockdown command and the second lockdown command; and overriding the default plan by controlling the locking mechanism based on the selected lockdown command.

Clause 14. The method of clause 13, wherein the first lockdown command and the second lockdown command are identical.

Clause 15. The method of clause 13, wherein: the first lockdown command associated with the a lockdown plan; the second lockdown command is associated with a second lockdown plan; and the method further comprises determining a selected lockdown command by selecting one of the first lockdown command and the second lockdown command based on the ranks of the first lockdown plan and the second lockdown plan, regardless of the first time of receipt and the second time of receipt.

Clause 16. The method of clause 13, wherein: the first lockdown command is of a first type; the second lockdown command is of a second type; and wherein the method further comprises controlling the locking mechanism by executing the first lockdown command and the second lockdown command based on the first time of receipt and the second time of receipt.

Clause 17. The method of clause 13, wherein: receiving the first lockdown command includes receiving the first lockdown command from a first device; receiving the second lockdown command includes receiving the second lockdown command from a second device; and each of the first device and the second device is one selected from a group consisting of a computing device, a network gateway, a wireless access point, a wireless lock, and a portable communication device.

Clause 18. The method of clause 13, wherein: receiving the second lockdown command includes receiving the second lockdown command from either one of the transceiver or a second transceiver.

Clause 19. The method of clause 13, further comprising: retransmitting at least one of the first lockdown command and the second lockdown command.

Clause 20. The method of clause 13, wherein: overriding the default plan includes controlling the locking mechanism based on the selected lockdown command and an override time limit.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An apparatus comprising:
  a locking mechanism;
  a transceiver;
  a memory storing a default plan for the locking mechanism; and
  an electronic processor coupled to the locking mechanism, the transceiver, and the memory;
  wherein the electronic processor is configured to retrieve, from the memory, executable instructions that, when executed by the electronic processor, cause the electronic processor to:
  control the locking mechanism based on the default plan and a current time;
  receive, via the transceiver, a first lockdown command sent according to a first protocol;
  receive a second lockdown command sent according to a second protocol;
  determine a selected lockdown command by selecting one of the first lockdown command and the second lockdown command based on a first time of receipt for the first lockdown command and a second time of receipt for the second lockdown command;
  discard the other of the first lockdown command and the second lockdown command; and
  override the default plan by controlling the locking mechanism based on the selected lockdown command.

2. The apparatus of claim 1, wherein the first lockdown command and the second lockdown command are identical.

3. The apparatus of claim 1, wherein:
  the memory stores a first lockdown plan; and
  the first lockdown command and the second lockdown command are associated with the first lockdown plan.

4. The apparatus of claim 1, wherein:
  the memory stores a first lockdown plan and a second lockdown plan, each having a rank;
  the first lockdown command is associated with the first lockdown plan;
  the second lockdown command is associated with the second lockdown plan; and
  the electronic processor is configured to:
  determine a selected lockdown command by selecting one of the first lockdown command and the second lockdown command based on the ranks of the first lockdown plan and the second lockdown plan, regardless of the first time of receipt and the second time of receipt.

5. The apparatus of claim 1, wherein:
  the first lockdown command is of a first type;
  the second lockdown command is of a second type; and
  the electronic processor is configured to, instead of determining a selected lockdown command:
  control the locking mechanism by executing the first lockdown command and the second lockdown command based on the first time of receipt and the second time of receipt.

6. The apparatus of claim 1, wherein each of the first lockdown command and the second lockdown command are either a trigger command or a revert command.

7. The apparatus of claim 1, wherein the electronic processor is configured to:
  receive the first lockdown command from a first device; and
  receive the second lockdown command from a second device.

8. The apparatus of claim 7, wherein each of the first device and the second device is one selected from a group consisting of a computing device, a network gateway, a wireless access point, a wireless lock, and a portable communication device.

9. The apparatus of claim 1, further comprising:
  a second transceiver,
  wherein the electronic processor is configured to:
  receive the second lockdown command from either one of the transceiver or the second transceiver.

10. The apparatus of claim 1, wherein each of the first protocol and the second protocol is one selected from a group consisting of a wireless LAN protocol, a cellular protocol, a near-field communication protocol, a peer-to-peer networking protocol, and a wired networking protocol.

11. The apparatus of claim 1, wherein the electronic processor is configured to retransmit, via the transceiver, at least one of the first lockdown command and the second lockdown command.

12. The apparatus of claim 1, wherein the electronic processor is configured to:
  override the default plan by controlling the locking mechanism based on the selected lockdown command and an override time limit.

13. A method comprising:
  controlling, with an electronic processor, a locking mechanism based on a default plan and a current time;
  receiving, via a transceiver, a first lockdown command sent according to a first protocol;
  receiving a second lockdown command sent according to a second protocol;
  determining a selected lockdown command by selecting one of the first lockdown command and the second lockdown command based on a first time of receipt for the first lockdown command and a second time of receipt for the second lockdown command;
  discarding the other of the first lockdown command and the second lockdown command; and overriding the default plan by controlling the locking mechanism based on the selected lockdown command.

14. The method of claim 13, wherein the first lockdown command and the second lockdown command are identical.

15. The method of claim 13, wherein:
the first lockdown command associated with the a lockdown plan;
the second lockdown command is associated with a second lockdown plan; and
the method further comprises determining a selected lockdown command by selecting one of the first lockdown command and the second lockdown command based on the ranks of the first lockdown plan and the second lockdown plan, regardless of the first time of receipt and the second time of receipt.

16. The method of claim 13, wherein:
the first lockdown command is of a first type;
the second lockdown command is of a second type; and
wherein the method further comprises controlling the locking mechanism by executing the first lockdown command and the second lockdown command based on the first time of receipt and the second time of receipt.

17. The method of claim 13, wherein:
receiving the first lockdown command includes receiving the first lockdown command from a first device;
receiving the second lockdown command includes receiving the second lockdown command from a second device; and
each of the first device and the second device is one selected from a group consisting of a computing device, a network gateway, a wireless access point, a wireless lock, and a portable communication device.

18. The method of claim 13, wherein:
receiving the second lockdown command includes receiving the second lockdown command from either one of the transceiver or a second transceiver.

19. The method of claim 13, further comprising:
retransmitting at least one of the first lockdown command and the second lockdown command.

20. The method of claim 13, wherein:
overriding the default plan includes controlling the locking mechanism based on the selected lockdown command and an override time limit.

* * * * *